United States Patent [19]

Bertot

[11] Patent Number: 5,012,691
[45] Date of Patent: May 7, 1991

[54] CLUSTER OF MOLDED GEARS WITH HELICAL TEETH

[75] Inventor: Maurice M. Bertot, Luxueil Les Bains, France

[73] Assignee: ECIA - Equipements Et Composants Pour L'Industrie Automobile, Audincourt, France

[21] Appl. No.: 919,296

[22] Filed: Oct. 15, 1986

[30] Foreign Application Priority Data

Oct. 16, 1985 [FR] France ................. 85 15348

[51] Int. Cl.⁵ ............................................. B29D 15/00
[52] U.S. Cl. ....................................... 74/434; 74/458; 74/DIG. 10; 249/59
[58] Field of Search ................. 74/457, 458, 640, 431, 74/434, DIG. 10, 347, 348; 29/159.2; 264/318; 249/117, 57, 59

[56] References Cited

U.S. PATENT DOCUMENTS

| | | | |
|---|---|---|---|
| 1,803,295 | 9/1929 | Bethune | 74/466 |
| 2,767,438 | 10/1956 | Pingel | 74/434 |
| 2,821,863 | 2/1958 | Bliss et al. | 29/159.2 |
| 3,394,432 | 7/1968 | Laurent | 29/159.2 |
| 3,694,127 | 9/1972 | Takahashi et al. | 425/352 |
| 3,742,803 | 4/1973 | Goldfarb | 249/102 |
| 3,891,367 | 6/1975 | Signora | 29/159.2 |
| 4,220,051 | 9/1980 | Catlett | 74/89.17 |

FOREIGN PATENT DOCUMENTS

| | | |
|---|---|---|
| 425691 | 2/1938 | Belgium . |
| 2714020 | 12/1978 | Fed. Rep. of Germany . |
| 1400399 | 4/1965 | France . |
| 2018176 | 10/1979 | United Kingdom . |

OTHER PUBLICATIONS

McGraw-Hill Encyclopedia of Science & Technology, ©1982, vol. 1, p. 666, definition of :"Arc (mathematics)".

Primary Examiner—Leslie A. Braun
Assistant Examiner—Scott Anchell
Attorney, Agent, or Firm—Sughrue, Mion, Zinn, Macpeak & Seas

[57] ABSTRACT

This cluster of moulded gears with the helical teeth, comprising a group of coaxial pinions of which the teeth have the same helical sense and the same pitch, is characterized in that, Mrn and Mri designating the real moduli of any pinions respectively of rank n and of rank i of the group, Zn and Zi designating the numbers of teeth of the said pinions, and $\beta n$ and $\beta i$ designating their helical angles, the following relationship exists between these different parameters:

$$\sin \beta n = \sin \beta i \; Mri \; Zn / Mrn \; Zi$$

5 Claims, 2 Drawing Sheets

CLUSTER OF MOLDED GEARS WITH HELICAL TEETH

The present invention is concerned with gears with helical teeth and it relates more particularly to a moulded cluster of gears with helical teeth.

The manufacture of gears by moulding is particularly interesting, notably because of the appreciable reduction in weight resulting from the replacement of a metal by a plastic material, and of the reduction of the cost price of such parts, it being possible to replace the shaping by milling machine or cutter by mass production moulding.

Furthermore, the progress as regards the strength of plastic materials has enabled the applications of such gears to be diversified, particularly in micro-mechanics, in general mechanics, and in the automobile domain.

For certain applications, it is necessary to have available a cluster of stepped gears, either with straight teeth or with helical teeth, and it is known that it is more economic to mould a cluster of gears rather than to bring individual gears together coaxially.

The manufacture and more particularly the stripping from the mould of a cluster of stepped gears with straight teeth is relatively easy, but this is not the case for a cluster of stepped gears with helical teeth.

In fact, the stripping from the mould of a gear with helical teeth is done by a displacement, for example, of this gear with respect to a matrix, this displacement being broken down into a rotation $\alpha$ combined with a translation t, where t is proportional to $\alpha$:

$$t = k\alpha$$

If $\alpha$ expressed in radians and if P is the pitch of the helix of the gear, expressed in mm and traced on the pitch circle of the gear, the displacement of the latter with respect to the matrix for $\alpha = 2\pi$ is equal to t mm, giving the following relations:

$$K = P/2\pi,$$

and $$t = \alpha \times P/2\pi$$

It is seen, therefore, that if, in a cluster of gears with helical teeth, the coefficients K of the gears are different, the cluster of stepped gears cannot be stripped from the mould by a single translation and a single rotation.

Until now, the gears of such a cluster of gears were formed separately, then assembled coaxially in order to form the said cluster.

An arrangement is also known which enables two coaxial gears with helical teeth of different characteristics to be moulded.

This arrangement comprises two matrices rotatable one against the other, in order to permit the two gears to be stripped from the mould.

Such a device is relatively complex and the manufacturing cost is relatively high. Furthermore, the fact that the matrices are movable one relative to the other, damages the precision of the moulded cluster.

The object of the invention, therefore, is to solve the problems described above by proposing a cluster of moulded gears with helical teeth, which is particularly well suited for fabrication by moulding.

For this purpose, the subject of the invention is a cluster of moulded gears with helical teeth, the teeth of which have the same helical direction and the same pitch, characterized in that, if Mrn and Mri designate the real moduli of the pinions respectively of any rank n and rank i of the cluster, Zn and Zi designating the numbers of teeth of the said pinions and $\beta n$ and $\beta i$ designating their helical angles, there exists the following relationship between these different parameters:

$$\sin\beta n = \sin\beta i \times Mrn \, Zn / Mri \, Zi$$

According to another aspect, the invention also has as its subject a device for the manufacture by moulding of a cluster as previously defined, characterized in that it comprises a first part of the mould defining a plane surface and including means for the injection of the material, a second part of the mould arranged with respect to the first, including a matrix, which, together with the said plane surface, delimits a moulding cavity, this matrix being formed in a single piece and shaped so as to reproduce the said cluster, and means for the ejection of the said cluster from the said matrix.

The invention will be better understood with the help of the following description, given only by way of example and with reference to the attached drawing which represents a device for the manufacture by moulding of a cluster according to the invention.

Figure 1:
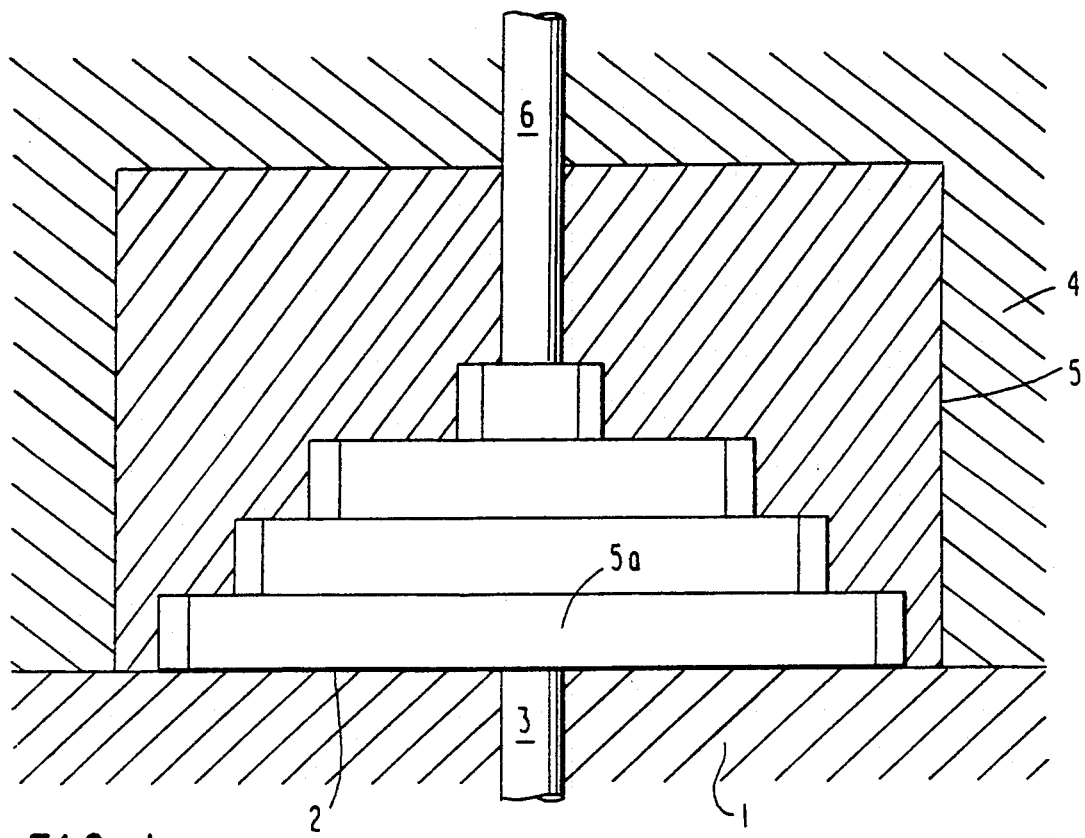
FIG. 1 is a cross-sectional view of a device for moulding a cluster according to the invention.
Figure 2:
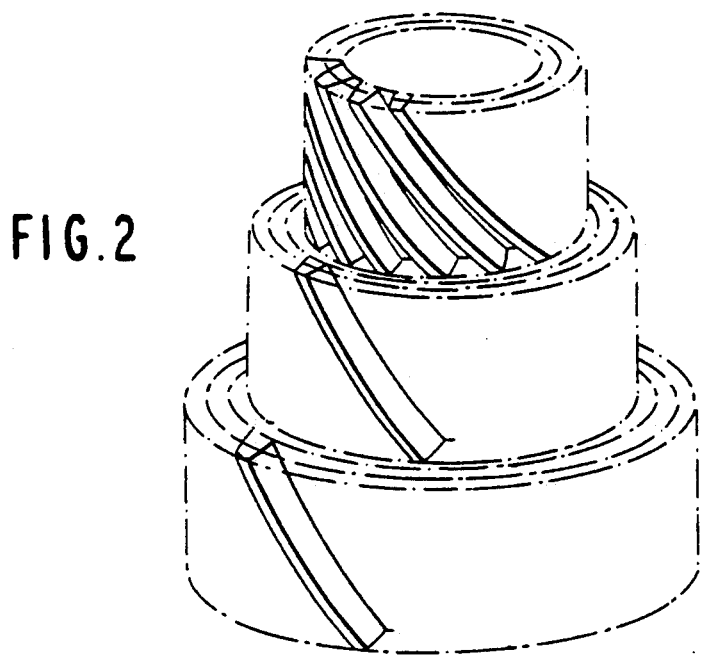
FIG. 2 is a perspective view of a cluster of integral moulded plastic gears in accordance with the invention.

As can be seen from this drawing, the device for the manufacture by moulding of a cluster according to the invention comprises a first part 1 of the mould defining a plane surface 2 and means 3 for injecting material. This device includes also a second part 4 of the mould arranged with respect to the first, and comprising a matrix 5, which, together with the said plane surface of the first part of the mould, delimits a moulding cavity 5a.

This matrix 5 is formed in a single piece and is shaped in such a way as to reproduce a cluster which will be described in more detail in the following.

The device according to the invention also includes means 6 for the ejection of the cluster of gears from the said matrix, these means extending through the said matrix and the said second part of the mould.

The matrix 5 is shaped so as to reproduce a cluster of gears moulded with helical teeth, comprising a cluster of coaxial pinions, for example four, the teeth of which have the same helical sense and the same pitch.

Stripping from the mould such a cluster of gears in a single piece demands that the pinions of the cluster present certain characteristics.

Thus, if Mrn and Mri designate the real moduli of the pinions of any rank n and rank i respectively of the cluster, Zn and Zi designate the numbers of teeth of the said pinions and $\beta n$ and $\beta i$ designate their helical angles, there must exist between these different parameters the following relationship:

$$\sin\beta n = \sin\beta i \, Mrn \, Zn / Mri \, Zi$$

Such a relationship between the parameters of the different pinions enables the whole to be stripped from the mould in a single operation of rotation combined with a translation as previously described.

It is to be noted that the different means of displacement of the cluster of gears and of the parts of the mould being well known in the present state of the technique, they are not further described in detail.

The relationship previously mentioned enables, for example, the helical angles of the different pinions comprising the cluster to be determined, starting from the helical angle determined for one pinion, in order that the stripping of the cluster from the mould can be carried out in a single operation.

Thus, for example, if it is desired to manufacture a cluster of three pinions with the following characteristics:

First pinion: $Z1=10$ teeth, $Mr1=0.6$ and $\beta1=35°$, which is fixed, for example, for a given application:

Second pinion: $Z2=70$ teeth, $Mr2=0.8$

Third pinion: $Z3=50$ teeth, $Mr3=1$:

It is necessary that the helix angles of the different pinions answer to the relationship previously mentioned in order that the stripping from the mould can be carried out in a single operation.

The calculation of the helix angle of the second pinion is therefore done by the relationship:

$$\sin\beta2 = \sin\beta1 \times Mr2 \times Z2 / Mr1 \times Z1,$$

from which $$\sin\beta2 = 0.530037631$$

and $$\beta2 = 32° \; 00'' \; 29''$$

The calculation of the helix angle of the third pinion is carried out in a similar manner:

$$\sin\beta3 = \sin\beta1 \times Mr3 \times Z3 / Mr1 \times Z1,$$

from which $$\sin\beta3 = 0.4732478848 \text{ and } \beta3 = 28° \; 14' \; 43''.$$

As a check, for example, the helix angle of the third pinion can be calculated starting from the second, which gives:

$$\sin\beta3 = 0.530037631 \times 1 \times 50 / 0.8 \times 70,$$

from which $$\sin\beta3 = 0.4732478848 \text{ and } \beta3 = 28° \; 14' \; 43''.$$

What is claimed is:

1. Cluster of integral moulded plastic gears with helical teeth comprising a cluster of integral stepped coaxial pinions of which the teeth have the same helical sense and the same pitch, characterized in that, among parameters, Mrn and Mri designating the reel moduli of the pinions of any rank n and i respectively of the cluster, Zn and Zi, designating the numbers of teeth of said pinions, and $\beta n$ and $\beta i$, designating their helix angles, there exists the following relationship:

$$\sin\beta n = \sin\beta i \; Mrn \; Zn / Mri \; Zi,$$

and in that the number of pinions is at least two, so that the moulded cluster can be stripped from a single moulding cavity in a fixed single-piece matrix in a single operation of rotation combined with a translation of the cluster.

2. Cluster of moulded gears as defined in claim 1, wherein the number of said integral stepped coaxial pinions is greater than two, and wherein said coaxial pinions are axially stacked.

3. Cluster of moulded plastic gears as defined in claim 2, wherein said number is three, and wherein said cluster comprises first, second and third pinions having the following respective characteristics:

First pinion: $Z1=10$ teeth, $Mr1=0.6$, $\beta1=35°$;
Second pinion: $Z2=70$ teeth, $Mr2=0.8$, $\beta2=32° \; 00' \; 29''$; and
Third pinion: $Z3=50$ teeth, $Mr3=1$, $\beta3=28° \; 14' \; 43''$.

4. Cluster of moulded plastic gears as defined in claim 2, wherein said number is four, and wherein successive ones of said axially stacked, coaxial pinions have successively larger diameters in the axial direction.

5. Cluster of moulded gears as defined in claim 1, wherein said single translation in millimeters is proportional to the angle of said single rotation in radians.

* * * * *